April 21, 1931. F. B. THOMAS 1,801,823
AUTOMOTIVE BRAKE
Filed March 14, 1928
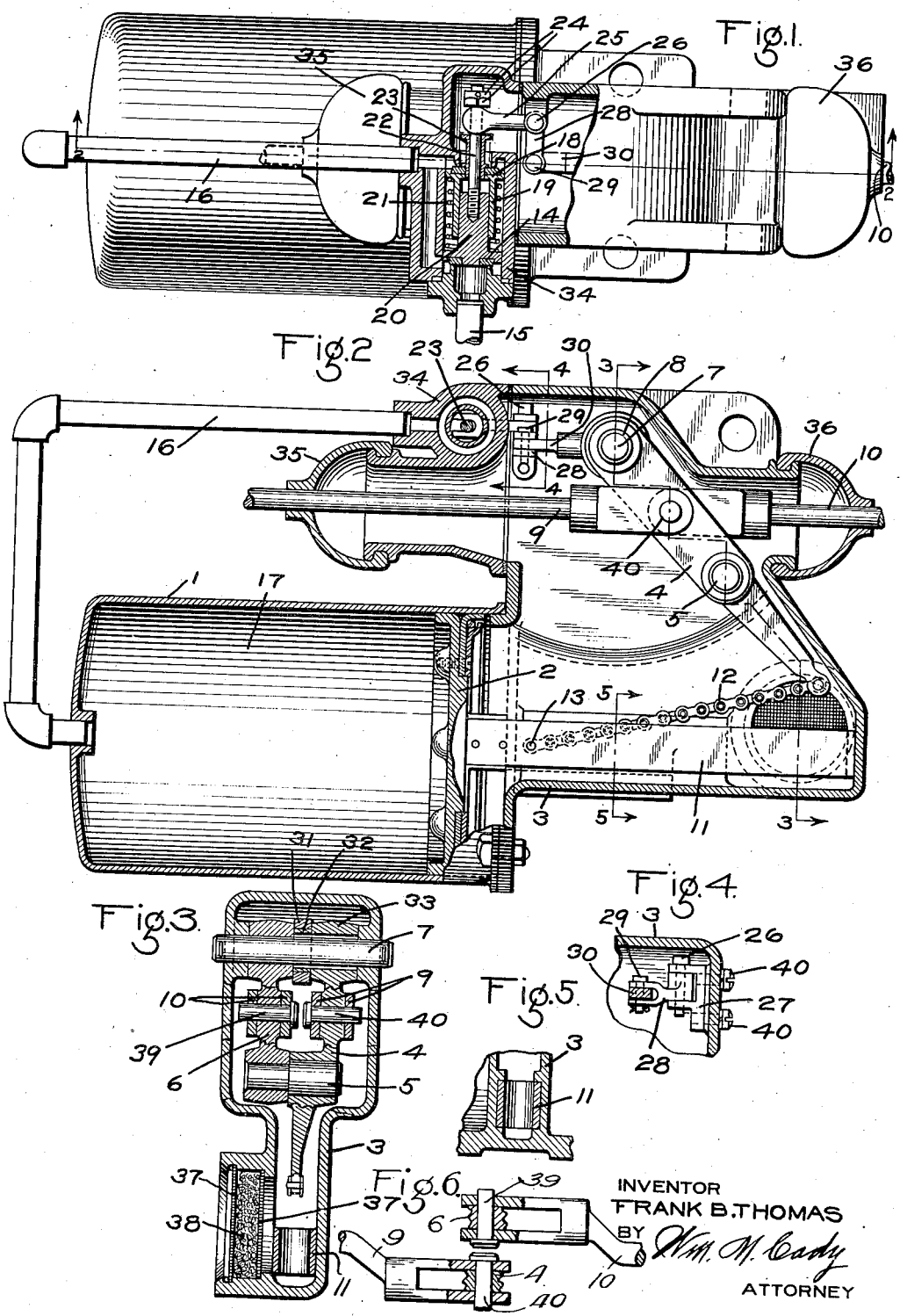
INVENTOR
FRANK B. THOMAS
BY Wm. M. Cady
ATTORNEY Patented Apr. 21, 1931

1,801,823

UNITED STATES PATENT OFFICE

FRANK B. THOMAS, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA

AUTOMOTIVE BRAKE

Application filed March 14, 1928. Serial No. 261,501.

This invention relates to power brakes, and more particularly to a brake adapted for automotive vehicles, in which the piston for controlling the brakes is operated by creating a partial vacuum on one side of the piston.

One object of my invention is to provide a brake of the above type having a flexible connection from the power piston to the brake and having a guide mechanism associated with the piston, so as to prevent cocking of the piston and to avoid the necessity for accurate machining of the cylinder and the piston.

Another object is to provide a controlling valve mechanism for the brake associated with a brake cylinder and having the axis of the valve mechanism at right angles to the axis of the brake cylinder, so as to provide a more compact construction.

In the accompanying drawing; Fig. 1 is a plan view, partly in section, of a brake controlling device embodying my invention; Fig. 2 a side elevation with the casing sectioned substantially on the line 2—2 of Fig. 1; Fig. 3 a section on the line 3—3 of Fig. 2; Fig. 4 a section on the line 4—4 of Fig. 2; Fig. 5 a section on the line 5—5 of Fig. 2; and Fig. 6 a partly sectioned plan view of the lever connections to the pedal rod and to the brake rod.

The brake mechanism may comprise a brake cylinder 1 which is preferably made of drawn metal with an integral head at one end and having the other end open. A piston 2 is mounted in the cylinder 1 and secured at the open end of the cylinder is a casing 3.

Mounted in the casing 3 is a lever 4 which is connected through a pivot pin 5 with a link 6 supported by a fixed shaft 7 secured in the casing. The shaft 7 extends through an opening 8 in the upper end of lever 4, the opening being of greater diameter than the shaft to permit a limited movement of the lever relative to the shaft.

Pivotally connected to the lever 4 at a point intermediate the pin 5 and the shaft 7 is a rod 9 which is operatively connected to a foot pedal (not shown). Pivotally connected to the link 6 at a point intermediate the pin 5 and the shaft 7 is a rod 10, which is operatively connected to the brakes of the vehicle.

According to my invention, a guide member 11 is secured to the piston, preferably in the form of a U shaped bar, the side walls of the casing 3 being adapted to provide guide faces for the guide member to slide on, as shown more particularly in Fig. 5. A chain or cable 12 is connected at one end by a pin 13 to the guide member 11, the other end of the chain being connected to the lower end of the lever 4.

In order to provide a compact arrangement of parts, the valve mechanism for controlling the fluid pressure variations on the piston 2 is disposed at right angles to the axis of the brake cylinder instead of parallel thereto and said valve mechanism may comprise a suction valve 14 of the poppet type adapted to control communication from a pipe 15, leading to a vacuum source, such as the intake manifold of an internal combustion engine, to a pipe 16, which leads to the chamber 17 at one side of the brake cylinder piston 2. A poppet valve 18 controls communication from the atmosphere to pipe 16 and said valve carries a sleeve 19, in which telescopes a stem 20, carried by the valve 14.

Interposed between the valves 14 and 18 is a spring 21 and secured to stem 20 is a rod 22. The rod 22 slides in a sleeve 23 carried by the valve 18 and interposed between the end of the sleeve 23 and nuts 24 on the rod 22 is the outer end of the arm 25 of a bell crank. The bell crank is mounted on a pivot pin 26 carried by a bracket 27 secured to the casing 3.

The outer end of the other arm 28 of the bell crank is connected by a pivot pin 29 to a rod 30. The outer end of rod 30 is provided with a bearing ring 31 which is mounted on a sleeve extension 32 of the hub 33 at the outer end of lever 4. The above described valve mechanism is mounted in a valve casing 34, which is secured to the casing 3.

A flexible dust guard 35 prevents the entrance of dirt into the casing 3, where the rod 9 extends out of the casing and a flexible dust guard 36 prevents entrance of dirt, where the rod 10 extends out of the casing. A breather opening is provided for the casing 3, and in this opening is disposed spaced foraminous plates 37 having the intermediate space filled with curled hair 38 or the like, so as to prevent the entrance of dirt and at the same time permit the to and fro flow of air through the opening.

It is not deemed necessary to explain in detail, the operation of the brake, since the brake, as such, forms no part of my invention, it being sufficient to state that when the rod 9 is pulled toward the left by depressing the foot pedal, the lever 4 is rocked on its pivot pin 5, causing a limited movement of the upper end of the lever relative to the shaft 7. The rod 30 is then shifted toward the left, causing the bell crank to be rocked, so that the stem 22 is lifted to unseat the valve 14 and thus connect the vacuum pipe 15 with pipe 16. Piston 2 is then shifted toward the left, due to the partial vacuum created in piston chamber 17.

The lever 4 is operated by the movement of the piston and also the link 6, so that the brakes are applied by movement of the rod 10. During the movement of piston 2, the guide member 11 acts to maintain the piston 2 against cocking in the cylinder and in the normal release position, as shown in Fig. 2, the outer end of the guide member 11 engages a wall of the casing 3, so as to limit outward movement of the piston 2 in the cylinder 1.

The pivot pin 39 and the pivot pin 40 are assembled before the lever mechanism is installed in the casing 3 and no cotter pins or other holding means are required, since the casing walls prevent the pins from moving laterally, far enough to permit the pivoted parts to become disconnected. The pivot pin 26 is assembled with the bracket 27 and the bell crank having the arms 25 and 28 before installation in the casing, the bracket being then secured in place by bolts 40. It will be seen that with this arrangement, no cotter pin or other holding means are required to prevent disengagement of the pin, since the wall of the casing prevents such disengagement.

The seat portions of the valves 14 and 18 are made of flexible material, such as composition rubber, instead of metal, so that leakage will not occur, even if small particles of dirt should lodge on the valve seats.

Having now described my invention, what I claim as new and desire to secure by Letters Patent, is:—

1. The combination with a cylinder and a piston therein, of a lever, a flexible member operatively connecting said lever to said piston and through which said lever is operated by said piston, a guide member carried by said piston and independent of said flexible member, a casing associated with said cylinder and having guide bearings for said guide member, and means for operating said lever independently of said piston, the flexible connection permitting such independent movement.

2. The combination with a cylinder and a piston therein, of a guide member carried by said piston, and a casing associated with said cylinder and having guide bearings for said guide member, the outer end of said guide member being adapted to engage a wall of said casing to limit outward movement of said piston.

In testimony whereof I have hereunto set my hand.

FRANK B. THOMAS.